United States Patent [19]

Smith

[11] Patent Number: 5,349,329
[45] Date of Patent: Sep. 20, 1994

[54] VEHICLE SECURITY APPARATUS AND METHOD

[75] Inventor: Jerry R. Smith, Littleton, Colo.

[73] Assignee: Ideaz International, Inc., Englewood, Colo.

[21] Appl. No.: 59,448

[22] Filed: May 7, 1993

[51] Int. Cl.$^5$ .................. B60R 25/10; G08B 1/08
[52] U.S. Cl. .................................. 340/539; 340/426
[58] Field of Search .............. 340/425.5, 426, 539; 307/10.2, 10.3

[56] References Cited

U.S. PATENT DOCUMENTS

| | | | |
|---|---|---|---|
| 3,646,515 | 2/1972 | Vodehnal | 340/425.5 |
| 4,023,138 | 5/1977 | Ballin | 340/539 |
| 4,101,873 | 7/1978 | Anderson | 340/539 |
| 4,143,368 | 3/1979 | Route et al. | 340/426 |
| 4,260,982 | 4/1981 | DeBenedictis | 340/539 |
| 4,598,272 | 7/1986 | Cox | 340/539 |
| 4,598,275 | 7/1986 | Ross et al. | 340/573 |
| 4,675,656 | 6/1987 | Narcisse | 340/539 |
| 4,733,215 | 3/1988 | Memmola | 340/426 |
| 4,785,291 | 11/1988 | Hawthorne | 340/573 |
| 4,924,206 | 5/1990 | Ayers | 340/426 |
| 4,987,406 | 1/1991 | Reid | 340/426 |
| 5,132,660 | 7/1992 | Chen et al. | 340/425.5 |

*Primary Examiner*—John K. Peng
*Assistant Examiner*—Benjamin C. Lee
*Attorney, Agent, or Firm*—Timothy J. Martin; Carl Schaukowitch

[57] ABSTRACT

An anti-theft apparatus to prevent "car jacking" includes a transmitter carried by the driver and a receiver and a switch circuit installed in the vehicle such that, when the receiver fails to detect the signal broadcast by the transmitter, the switch circuit disables the vehicle for operation. Timer circuitry is disclosed to cause the disablement only after a selected period that the broadcast signal is lost. An event detector, such as a switch circuit connected to the door light switch circuit of the vehicle, may be used to arm the disable circuit for a selected period so that disablement occurs only when the transmitter and receiver are separated beyond their communication range during a defined time interval following the occurrent of the event.

26 Claims, 6 Drawing Sheets

VEHICLE SECURITY APPARATUS AND METHOD

FIELD OF INVENTION

The present invention broadly concerns protective devices and methods used to provide security for vehicles against theft. More specifically, the present invention relates to apparatus and methods that may be employed to protect against theft while the vehicle is in operation by causing removal of the operator therefrom under force or threat of force.

BACKGROUND OF THE INVENTION

Ever since the development of a mechanized vehicle industry, the protection of such vehicles against theft has been of great concern, primarily due to their monetary value. In an early effort to protect such vehicles, manufacturers installed doorlocks so that the owner could lock the vehicle at times when the owner was not going to be present. Likewise, manufacturers fairly early began installing keyed locking switches that were interposed in the electrical ignition system of the vehicle. In such systems, an ignition key is necessary to actuate such a locking switch which then completes the electrical circuit in the electronic ignition system. While these systems proved useful, thieves have learned techniques for circumventing such systems.

Subsequently, manufacturers developed mechanical locking systems for theft prevention. One such example is an internal lock on the steering mechanism of the vehicle. Again, methods of circumvention were developed by those who wanted to steal the vehicles. Retro-fit locking appliances, such as Steering wheel lock bars were developed, but these proved cumbersome and inconvenient to use. Various electronic alarms have been employed to signal an alarm, such as by blowing the vehicle horn, blinking the vehicle's lights and/or sounding sirens, in an effort to reduce the likelihood of vehicle theft.

The aforementioned techniques, whether installed by manufacturers or employed as retro-fit systems, address the situation of theft of the vehicle usually while it is not in operation and unattended. For whatever reason, there has been a recent increase of vehicle theft just as the owner is starting the vehicle or while the vehicle is in operation but stopped in transit. Such latter situations often may occur at a traffic control signal or where the operator desires to momentarily step out of the vehicle such as for an errand. In this type of theft, recently referred to as "car jacking", a thief causes the operator to exit the vehicle either under force or under the threat of force, and the thief thereafter drives away with the vehicle, the operator's ignition keys necessary for maintaining access and operation of the vehicle and whatever possessions that are in the vehicle.

The present invention addresses the need for security systems to prevent or deter car jacking and employs a new and non-obvious integration of electronic proximity detection with electronic control circuitry of a vehicle. To this end, it should be understood in this description that the word "vehicle" could broadly encompass any motor powered transportation vehicle including, but not limited to, cars, trucks, boats, etc. Furthermore, the term "motor powered" in this context is not limited to vehicles powered by internal combustion engines but could include the developing technology of electric vehicles or other power systems as well. The present invention is directed to interact with the electronic control system of such motor powered vehicles whether it be the electronic ignition system of a typical internal combustion engine driven vehicle or any of the electronic circuitry of an electrically powered vehicle.

As noted above, the present invention integrates proximity detection with the electronic control circuitry of a vehicle. As is known, proximity detection may utilize a transmitter which transmits a signal, such as a radio signal, on a selected frequency, and a receiver tuned to receive that frequency. In some implementations of this technology, an alarm is sounded when the transmitter and receiver come within a threshold distance of one another, and the receiver thereby receives the transmitted signal, in order to sound an alarm indicating such closeness. Another implementation of such technology contemplates the indication of an alarm when the transmitter and receiver are separated a distance greater than a threshold communication distance.

An example of this technology is described in U.S. Pat. No. 4,260,982 issued Apr. 7, 1981 to DeBenedictis et al. In this patent, a pulse coded modulation responsive alarm system is provided to produce an alarm whenever the distance between a transmitter and a receiver exceeds a predetermined distance. This patent discusses that the system may be used to prevent loss of luggage or theft of other objects, and the patent discusses pre-existing alarm circuits used, for example, with automobiles. The earlier systems were proned to fail due to the possible presence of interference signals which the receiver would sense thereby falsely indicating that the transmitter was in the acceptable predetermined distance. To solve this, the transmitter in the '982 Patent broadcast a signal that is pulse coded at a selected frequency at a reduced duty cycle. The receiver, correspondingly, is tuned to the selected frequency and is adjustable in sensitivity to set the predetermined range of operation. A timer circuit is provided which reset each time a pulse is detected by the receiver but, after the absence of a series of pulses, the timer triggers and activates an alarm.

Other prior inventions have described alarm or electronic monitoring circuits which may be employed in a variety of ways. For example, U.S. Pat. No. 4,785,291 issued Nov. 15, 1988 to Hawthorne discloses a monitoring apparatus that is affixed to a person, such as a child, to be monitored and a receiver/monitor apparatus that may be maintained, for example, by a parent to monitor the movement of the child beyond a predetermined range. U.S. Pat. No. 4,675,656 issued Jun. 23, 1987 to Narcisse likewise shows an out-of-range personal monitor and alarm. U.S. Pat. No. 4,101,873 issued Jul. 18, 1978 to Anderson et al discloses a system to interrogate the position of objects to sound an audible response so that the object can be located. U.S. Pat. No. 4,598,272 issued Jul. 1, 1986 to Cox likewise shows an electronic monitoring system for monitoring a persons whereabouts. U.S. Pat. No. 4,792,796 issued Dec. 20, 1988 to XXX also shows an encoded transmission signal and circuitry that generates an alarm for indicating failure of reception of the coded signal to monitor the presence or absence thereof.

Despite the development of both the security devices described above, there remains a need for improved security systems which protect owners and operators from theft of their vehicles. There is further a specific need for systems which protect against or serve to deter car jacking and similar crimes. There is a need for such system which can be manufactured as original equipment on a vehicle or easily integrated with an existing vehicle.

SUMMARY OF THE INVENTION

It is an object of the present invention to provide a new and useful apparatus and method for protecting against theft of a motor-powered vehicle.

Another object of the present invention is to provide an apparatus and method for combating forced usurpation, i.e. "car jacking", of a vehicle from the rightful operator.

A further object of the present invention is to provide an apparatus and method for temporarily disabling a vehicle should it be improperly removed from the vicinity of the rightful operator.

A still further object of the present invention is to provide an apparatus that may retro-fit onto the existing electronic controlled systems of motor powered vehicles in order to monitor the presence of the rightful operator and to benignly disable operation of the vehicle should the operator be displaced and the vehicle stolen while the vehicle is in operation.

Yet another object of the present invention is to provide an inexpensive, reliable security system and method of protecting a vehicle which is simple to install on existing vehicles without interfering with the normal operation thereof yet which will protect against car jacking.

According to the present invention, then, an anti-theft apparatus and method is described for use with motor powered vehicles. The anti-theft apparatus is adapted to interconnect with an electronic control circuit of the vehicle and is operative to selectively disrupt the control circuit to disable the vehicle. Broadly, the apparatus includes a transmitter which is adapted to be carried by a driver of the vehicle and which is operative to produce a broadcast signal of selected frequency. The vehicle carries a receiver, and this receiver is operative to receive the broadcast signal when the transmitter is within a communication range. When the receiver fails to receive the broadcast signal, when the transmitter is out of the communication range, the receiver operates to produce an out-of-range signal. A switch circuit includes a switch element that is interposed in the electronic control circuit of the vehicle and has a switch active state wherein said control circuit is operative so that the vehicle is enabled and a switch inactive state wherein the control circuit is disrupted to disable the vehicle. A switch control circuit is provided and operates in response to the out-of-range signal to cause the switch element to change from the switch active state to the switch inactive state.

Preferably, the anti-theft apparatus includes timer circuitry associated with the receiver so that the out-of-range signal is produced only after the receiver fails to receive the broadcast signal for a selected time duration, for example, approximately five seconds. Furthermore, it is preferred that the anti-theft apparatus includes an event detector operative to sense the occurrence of a selected event, such as the opening of a door of the vehicle, and produces an arming signal in response to the occurrence. The switch control circuit is then operative in response to the out-of-range signal to cause the switch element to change from the switch active state to the switch inactive state only when the arming signal is present. In this case, the event detector includes a time out circuit operative to discontinue the arming signal following a time interval after the occurrence of the event, and this time interval may be selected to be in the range of two to ten minutes. Here, also, the event detector may be electrically connected to a standard door monitoring circuit provided in the vehicle. In any event, the switch control circuit preferably operates to lock the switch element in a switch inactive state in response to the out-of-range signal, and a reset circuit is provided in order to be selectively actuated to unlock the switch element from the switch inactive state.

The broad method according to the present invention, therefore, contemplates the method of protecting a motor vehicle from theft accomplished by usurping operation of the vehicle from an operator thereof, displacing the operator out of the vehicle and removing the vehicle away from the operator. Here, the method is that method which is implemented by the above-described apparatus, and the method includes a first step of providing first means carried by the operator of the vehicle and second means carried by the vehicle with said first and second means for detecting a distance of separation between the operator and the vehicle. A second step includes the interposition of a switch element in the electronic control circuit of the vehicle wherein the switch element has a switch active state whereby the control circuit is operative and a switch inactive state whereby the control circuit is disrupted. Finally, the method includes the step of monitoring the distance of separation between the operator and the vehicle and changing the switch element from the switch active state to the switch inactive state when a distance of separation exceeds a threshold distance.

This broad method may include the step of changing the switch element from the switch active state to the switch inactive state only after the distance of separation has exceeded the threshold distance continuously for a selected time duration. The broad method may also include the step of monitoring for an occurrence of a selected event and wherein the step of changing the switch element from the switch active state to the switch inactive state occurs only if the distance of separation exceeds the threshold distance within a selected interval of time following occurrence of the selected event. This selected event, then, is preferred to be the opening of a door, and the method includes the step of interconnecting a detector element to the door monitoring circuit of the motor powered vehicle.

These and other objects of the present invention will become more readily appreciated and understood from a consideration of the following detailed description of the preferred embodiment when taken together with the accompanying drawings, in which:

DETAILED DESCRIPTION OF THE EXEMPLARY EMBODIMENTS

The present invention is directed to providing an anti-theft apparatus and method adapted for use with standard motor powered vehicles in order to prevent or deter theft of such vehicles. The apparatus is constructed so that it may be included as original equipment with a vehicle during manufacturer or which may be easily and cheaply retro-fitted onto an existing vehicle. In either event, the apparatus and method concerns the interrupting of an electronic control circuit of the vehicle in order to disable the vehicle in the event of theft, and particularly, car jacking. To this end, it should be understood that the electronic control circuit of the vehicle may be the ignition circuit for an internal combustion engine driven vehicle or any electrical power circuit for an electric vehicle, and the like.

Figure 1:
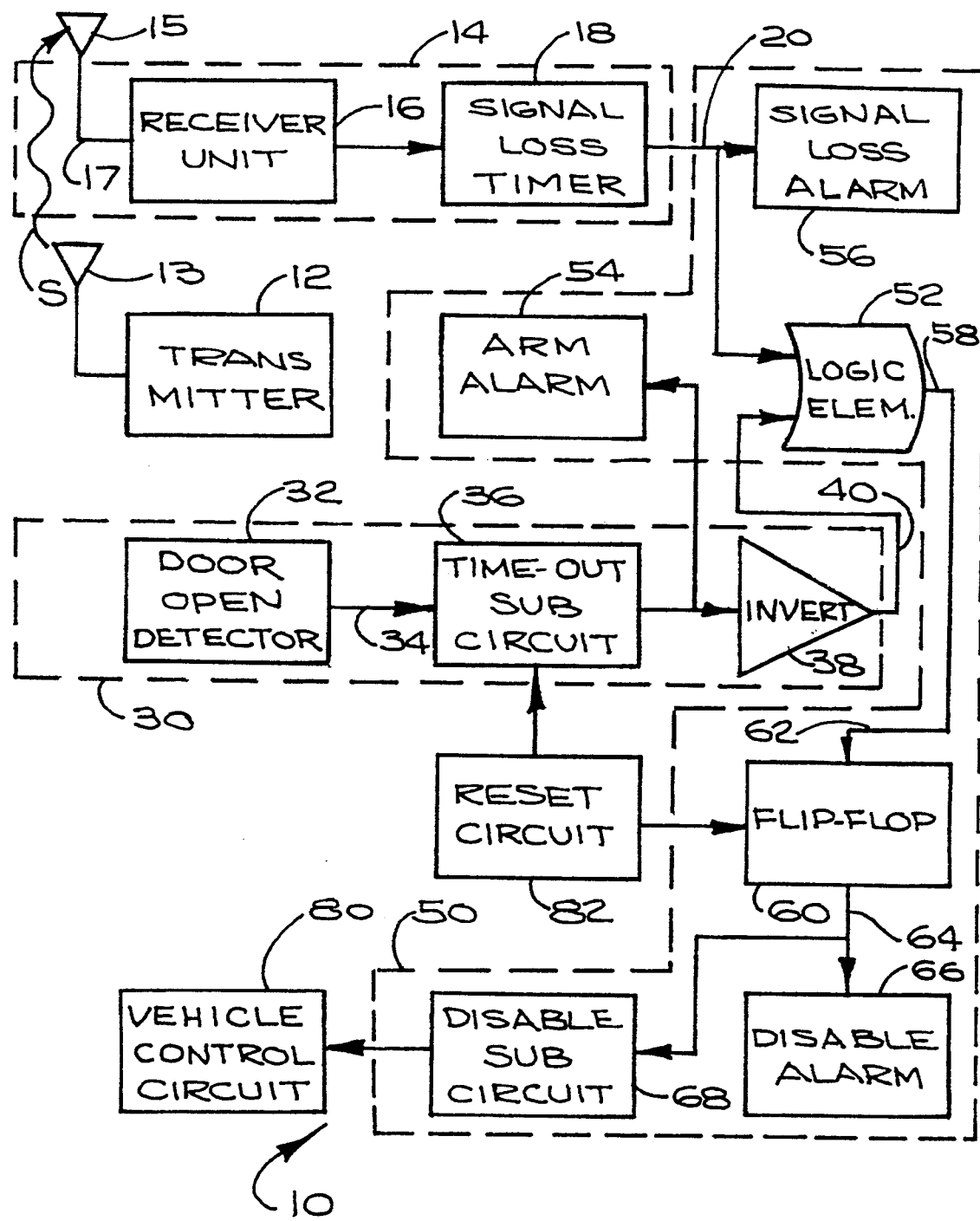
FIG. 1 is a block diagram showing a first exemplary embodiment of the present invention.

A block diagram of a first exemplary embodiment of the present invention, and in this instance the preferred embodiment, is shown in FIG. 1, although it should be appreciated that modification of the particular selected circuit may be made without departing from the scope of this invention. In FIG. 1, it may be seen that anti-theft apparatus 10 includes a transmitter 12 having an antenna 13 and a receiver 14 having an antenna 15. Receiver 14 includes a receiver unit 16 connected to antenna 15 and a signal loss timer 18 operative to receive signals from receiver unit 16. Transmitter 12 operates to produce a broadcast signal of a selected frequency as represented by broadcast signal "S". Receiver 14 operates to receive the broadcast signal at input 17. To this end, as described more thoroughly below, receiver unit 16 process analog signal "S" to produce a digital pulse signal that is counted by signal loss timer 18 so that, in the event that receiver 14 looses the broadcast signal for a selected time interval, signal loss timer 18 produces an "out-of-range" signal at output 20. Transmitter 12 is adapted to be carried by a driver of the vehicle while receiver 14 is adapted to be mounted to or carried in the vehicle and is operative to receive the broadcast signal when transmitter 12 is within a communication range of the receiver 14.

An event detector is provided and is operative to sense the occurrence of a selected event and to produce an arming signal in response to that occurrence. For example only, as is shown in FIG. 1, the occurrence to be sensed is the opening of a selected door of the vehicle. To this end, anti-theft apparatus 10 includes a detector circuit 30 having a door open detector sub-circuit 32 which produces an arming signal at output 34 when the event, such as the opening of the vehicle door, occurs. The arming signal is presented to a time out sub-circuit 36 which acts to present the arming signal to an inverter 38 which forms part of detector circuit 30.

A switch control circuit 50 includes a logic element 52 that is operative to receive both the out-of-range signal from output 20 and the inverted arming signal from output 40 from inverter 38. The arming signal from time out sub-circuit 36 may be presented to an arm alarm 54 while the out-of-range signal may be presented to a signal loss alarm 56 as shown in this Figure. Alarms 54 and 56 may be audio alarms, visual displays, indicator lights or the like. In any event, logic element 52 acts to sense the presence of both the arming signal and the out-of-range signal to produce a control signal at output 58 thereof. Control signal 58 is presented to input 62 of flip-flop element 60 which, upon receipt of the control signal at input 62 produces a disable signal at output 64 thereof. If desired, the presence of a disabled signal may be presented to a disable alarm 66 which again may be an audio, visual or other indicator alarm. In any event, the disable signal from output 64 of flip-flop 60 is presented to a disable sub-circuit 68 that is operative to drive a control circuit switch 80 that is interposed in the control circuit of the vehicle. Control circuit switch 80 is normally biased into an active state wherein the electronic control circuit of the vehicle is enabled. However, upon receipt of the disable signal from flip-flop 60, disabled sub-circuit 68 causes a control circuit switch to move into an inactive state which disrupts the electronic vehicle control circuit 80 of the vehicle thereby disabling operation of the vehicle.

Figure 2:
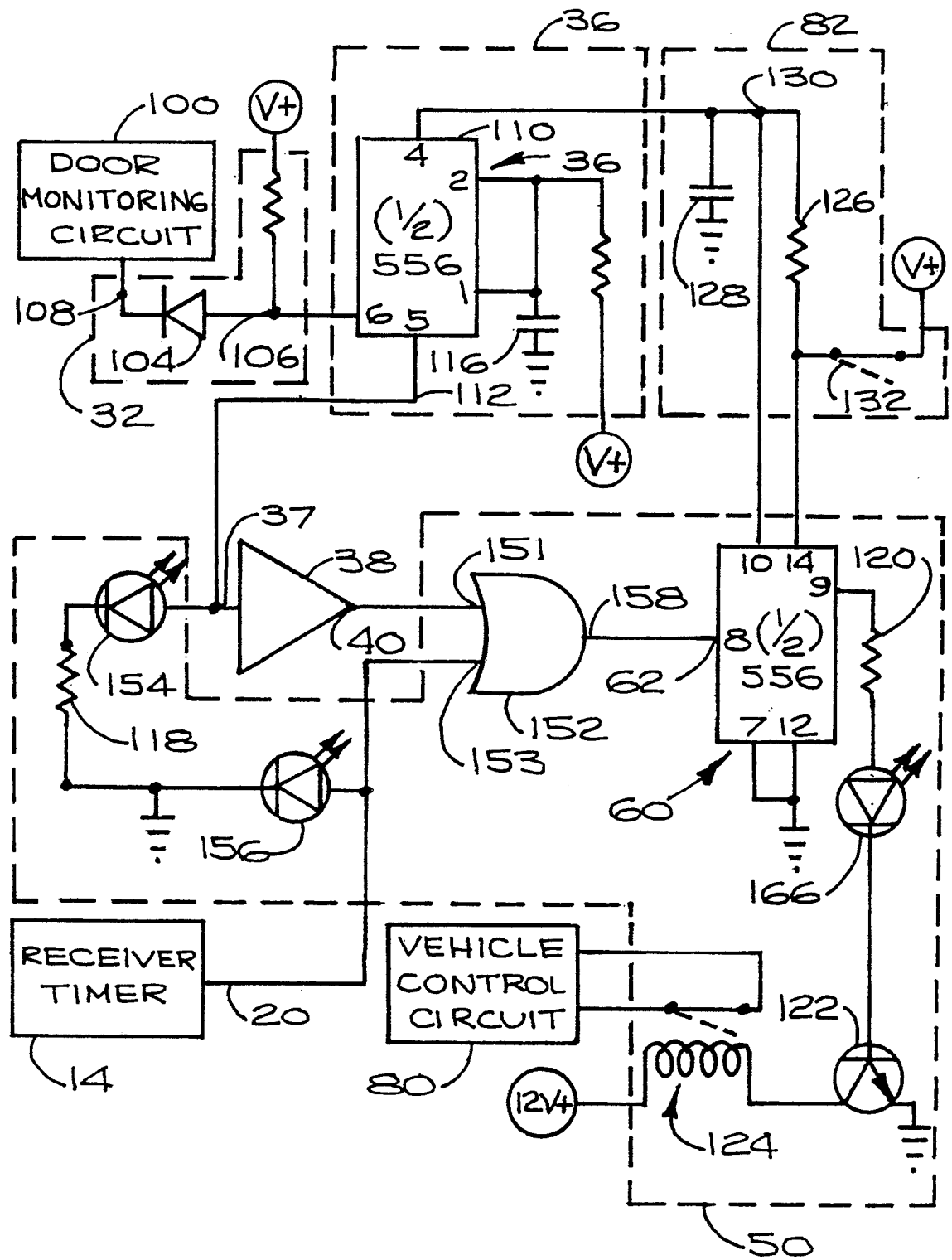
FIG. 2 is a partial block diagram and partial schematic diagram of the electronic circuitry according to the invention shown in FIG. 1.

The block diagram circuit of FIG. 1 may be simply implemented by the electronic circuitry shown in FIG. 2. Here, it may be seen that door open detector 32 is connected to the door monitoring circuit 100 of a standard vehicle. To this end, it should be understood that this door monitoring circuit includes a door switch that normally in an open state but, when the door opens, the door switch activates, for example, to light the interior compartment of the vehicle by means of door or overhead lights. This circuit may also include a "door ajar" alarm to advise the operator that the door is not completely closed. The door monitoring circuit of most vehicles is powered at 12 volts and, when the door is opened, the switch connects the circuit to ground. Accordingly, the door open detector sub-circuit of the present invention includes a resistor 102 and a diode 104 connected in series between a positive voltage source V+, and a door monitoring circuit 100. When the door monitoring circuit 100 is not activated, the connecting point 106 between resistor 102 and diode 104 is at voltage V+; however, when door monitoring circuit is activated, the negative side of diode 104, as indicated at location 108, goes to ground thereby causing location 106 to switch from voltage V+ to ground potential.

Time out sub-circuit 36 includes a timer element 110 which may be standard "555" circuit device as known in the art, but is preferably ½ of a standard "556" microcircuit, again as known in the art. To this end, pin 6 of the circuit chip 110 is pulled to ground when door monitoring circuit 100 becomes activated which causes chip 110 to produce a positive voltage signal at location 112 corresponding to pin 5 of circuit chip 110. This positive voltage signal thus defines the "arm" signal and last for a duration that is set by resistor 114 and capacitor 116. Here, it may be seen that pins 1 and 2 of circuit chip 110 are interconnected and are connected voltage V+ through resistor 114 and to ground through capacitor 116. Resistor 114 and capacitor 116 thus form an RC circuit defining the time constant for timer circuit chip 110. Resistor 114 and capacitor 116 may be selected as desired, but it is preferred that they be selected to provide a time interval for the arm signal that is between approximately two and ten minutes. The arm signal is then presented to input 37 of inverter 38 so that an inverted arm signal may be outputted at output 40 at inverter 38. A light emitting diode 154 is connected in series with resistor 118 to ground so that, when the positive voltage alarm signal is present at output 112, diode 154 activates to define the arm alarm 54 described with respect to FIG. 1.

Resistor 118 and diode 154 form part of switch control circuit 50 which includes an OR gate 152 that defines logic element 52, also described with respect to FIG. 1. As noted above, the out-of-range signal for receiver 14 is outputted at 20, and this out-of-range signal is presented to OR gate 152 at a second input 153 thereof. Light emitting diode 156 is connected between input 153 of OR gate 152 and ground so that the presence of the out-of-range signal causes light emitting diode 156 to activate, thus defining the signal loss alarm 56 described with respect to FIG. 1. Receiver 14 is constructed so that when it is receiving the broadcast signal from transmitter 12, receiver 14 outputs a positive voltage at potential V+. However, should a loss of the broadcast signal occur for longer than a selected duration, receiver 14 produces a logic "low" corresponding to ground potential so that input 153 goes to ground, in such event. The output 158 of OR gate 152 therefore is high, that is voltage V+, if either of inputs 151 or 153 are at a logic high. However, if both of inputs 151 and 153 are at a logic low, output 158 is at a logic low. The output of OR gate 152 is presented to flip-flop 60 which, is as seen in FIG. 2, comprises a second half of the standard "556" circuit chip 110. Accordingly, input 62 of flip-flop 60 corresponds to pin 8 of circuit chip 110, and flip-flop 60 has an output 64 at pin 9. Output 64 is at ground potential in the normal state, that is, when input 62 is at a logic high. However, when a logic low is inputted at input 62, flip-flop 60 changes its output from a logic low to a logic high and remains in that state until reset. To accomplish this, pins 7 and 12 of circuit chip 110 are interconnected to one another and to ground.

The disable sub-circuit 68 is provided by resistor 120, transistor 122 and relay switch 124 which is interposed in the vehicle control circuit 80. When output 64 of flip-flop 60 goes to positive voltage, that is, to the logic high, transistor 122 becomes conductive to ground thereby allowing light emitting diode 166 to activate and define disable alarm 66 described with respect to FIG. 1. Relay switch 124 is connected between the vehicle's power circuit, normally at 12 volts and to transistor 122. Thus, when transistor 122 becomes conductive, current can flow through relay switch 124 to ground. Relay switch 124 is selected to be of a type that is biased into the switch active state that, despite its interposition in the electronic control circuit of the vehicle, acts to allow normal operation of the vehicle. However, when transistor 122 becomes conductive, relay switch 124 places its switch portion in an inactive state thereby disrupting the control circuit of the vehicle and thus causing the vehicle to become disabled.

The vehicle will remain disabled until the circuit is reset by means of reset circuit 82 which includes a resistor 126 and a capacitor 128 connected between pin 4 of circuit chip 110 and ground. Pin 14 is connected to voltage V+, and pin 10 of circuit chip 110 is connected at location 130 between resistor 126 and capacitor 128. A momentary switch 132 is interposed between pin 14 and voltage V+ and is normal biased into a conductive state but may be momentarily opened to interrupt power to pin 14. When switch 132 is opened, pins 4, 10 and 14 of circuit chip 110 are discharged to ground through capacitor 128. This creates a logic low at these pins. When switch 132 then closes, pins 4, 10 and 14 power up through the logic high when capacitor 128 charges. This then resets flip-flop 60 and signal loss timer 18.

With respect to the circuit shown in FIG. 2, the following component table is provided to define the values selected according to this exemplary embodiment of the present invention:

TABLE I

| Resistors | Value (ohm) | Capacitors | Value (micro farads) |
|---|---|---|---|
| 102 | 10K | 116 | 10 |
| 114 | 10 Meg | 128 | .1 |
| 118 | 470 | | |
| 120 | 100 | | |
| 126 | 10K | | |

It should be understood that the ordinarily skilled circuit designer may make modification to the components and values thereof in order to adjust the parameters of the above described circuitry without departing from the scope of this invention.

Figure 3:
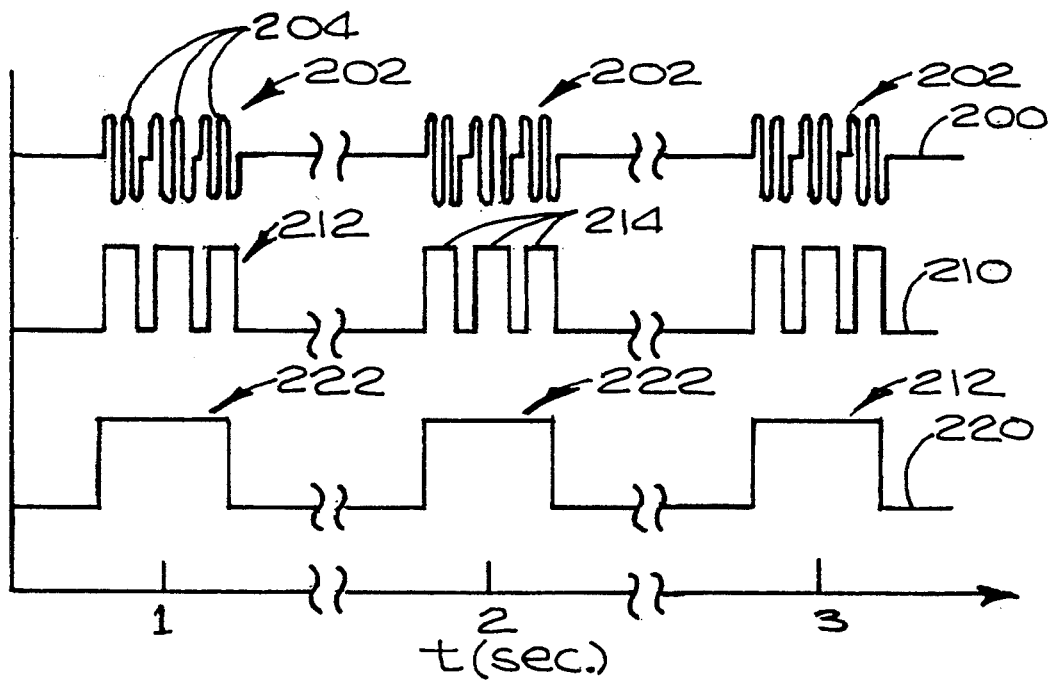
FIG. 3 is a graph showing the wave form of the unprocessed broadcast signal as well as the processed broadcast signal presented by the receiver to the signal loss timer.

Transmitter 12 is preferably of a standard, low power battery type, which may be conveniently carried in the pocket of the operator. This transmitter may, for example, operate on a carrier frequency in the range of slightly over 312 MHz which is the carrier frequency the type commonly used for garage door openers. The broadcast signal is shown in FIG. 3 as signal 200 where it may be seen that broadcast signal 200 is a series of pulse packets 202 each formed as a plurality of pulse bursts such as pulse burst 204 having the carrier frequency. Pulse packets 202 are spaced at one second intervals while pulse bursts 204 may have a coded pattern so that the receiver and transmitter may be coded such that receiver 14 only responds to the broadcast signal of transmitter 12. Receiver 14 converts pulse burst 204 into digital bursts 214 which are organized in digital packets 212 as is shown for signal 210 in FIG. 3. This signal is then converted into signal 220 which comprises digital packets 222 appearing as a pulse train having a frequency of one second. Pulse bursts 214 preferably have a frequency of approximately 700 Hz while each of pulse packets 202, 212 and 222 have a pulse width of approximately 20 millseconds. Signal 220 is presented to signal loss timer which monitors the presence and absence of pulse packets 222. The signal loss alarm signal is then outputted, at output 20, for example, when five consecutive pulse packets 220 are missing.

Figure 4:
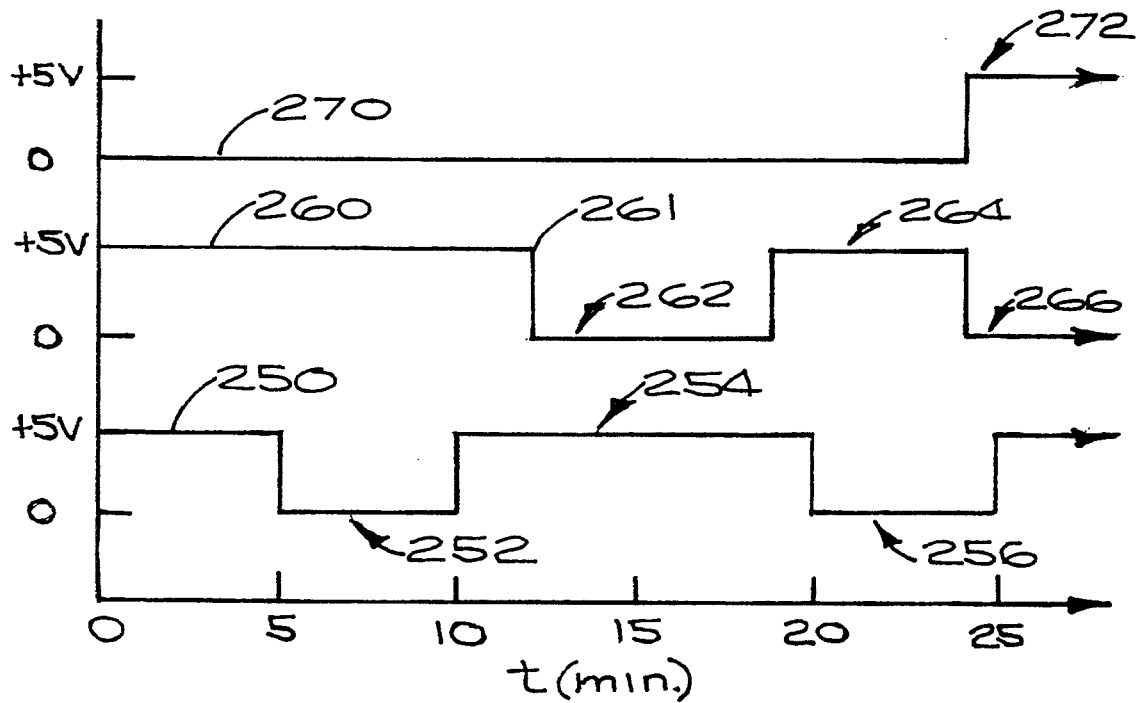
FIG. 4 is a graph showing the representative timing and wave form of the arming, out-of-range and disable signals according to the embodiment of the invention shown in FIGS. 1 and 2.

The interaction of the arm signal, the out-of-range signal and the disable signal is best diagrammed in FIG. 4. Here, a representative arm signal is shown as signal 250 which is shown to be in a logic high, that is, at a positive 5 volts, at time "zero" and remains at this state until five minutes have passed. At the five minute mark, the operator opens the door so that the door open detector circuit is pulled to a logic low, at the five minute interval. This logic low, designated 252, lasts for the time interval set by resistor 114 and resistor 116 for the RC time constant of the time out sub-circuit 36. Thus, at the ten minute mark, the alarm signal 250 returns to a logic high, designated at 254, for a ten minute interval. At the twenty minute mark, the operator again opens the door so that the alarm signal is inverted to a logic low, again for a five minute interval as represented at 256. After the time out, at the twenty-five minute mark, the signal again inverts to a logic high.

A representative out-of-range signal 260 is diagrammed in FIG. 3 to occur contemporaneously with the example of alarm signal 250. Here, for approximately twelve minutes, until point 261, the transmitter and the receiver remain in range of one another but, at that interval, it may be seen that the transmitter and receiver are separated beyond the communication range so that receiver 14 generates a logic low signal for a period of approximately six minutes, until the eighteen minute mark when the transmitter and receiver again come within range. This corresponds to logic low 262. The out-of-range signal remains at a logic high, as represented at 264, until the twenty-four minute mark when again the transmitter and receivers are separated a distance further than the communication range so that the out-of-range signal is pulled to a logic low.

Finally, with reference to FIG. 4, it may be seen that the disable signal remains constant, at a logic low, until the twenty-four minute mark notwithstanding the changes between the alarm signal and the out-of-range signal. However, at the twenty-four minute mark, the out-of-range signal goes to a logic low concurrently with the time out interval of the alarm signal. This corresponds to the vehicle door opening and the separation of the transmitter and the receiver within four minutes following the opening of the door. Upon simultaneous occurrence of the two logic lows, the OR gage 152 generates a logic low which toggles flip-flop 60 to generate a logic high activating the disable signal to disrupt the electronic control circuit of the vehicle and disable the vehicle from operation. This state would continue until the reset circuit, or activated, as described above.

From the foregoing, it may be seen that in real life, this situation might be one where an operator got out of his/her vehicle at the five minute mark, for example to get gasoline. The operator made his/her purchases during the five minute interval and inadvertently left the transmitter on the counter of the station. After driving off, at the twelve minute mark, the operator drove a short distance and, upon observing the out-of-range signal realized that he/she had left the transmitter at the station returned at the eighteen minute mark. At this point, a theft accosted the driver, at the twenty minute mark, and forced him/her to exit the vehicle which again armed the system. The theft then drove away with the vehicle and went out-of-range at the twenty-four minute mark, at which time the vehicle became disabled thereby thwarting the theft.

It should be appreciated from the foregoing scenario, that the sole presents of the out-of-range signal or the door open signal will not activate the vehicle disable system. However, in the usual event an operator is accosted at a traffic signal or other location while the vehicle is in operation, the operator will be forced out of the vehicle thereby arming the system at which time the theft will immediately drive off which result in a disabling of the vehicle.

Figure 5:
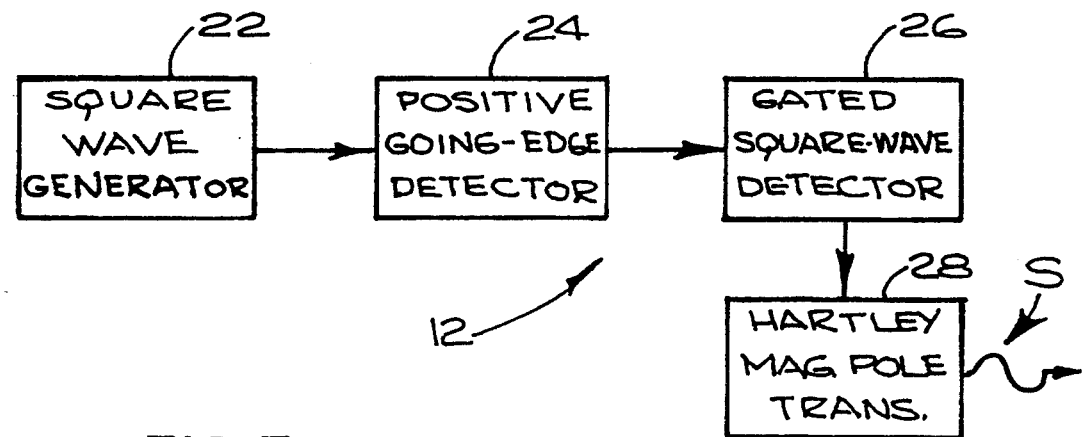
FIG. 5 is a block diagram showing a transmitter of a type for use with the present invention.
Figure 6:
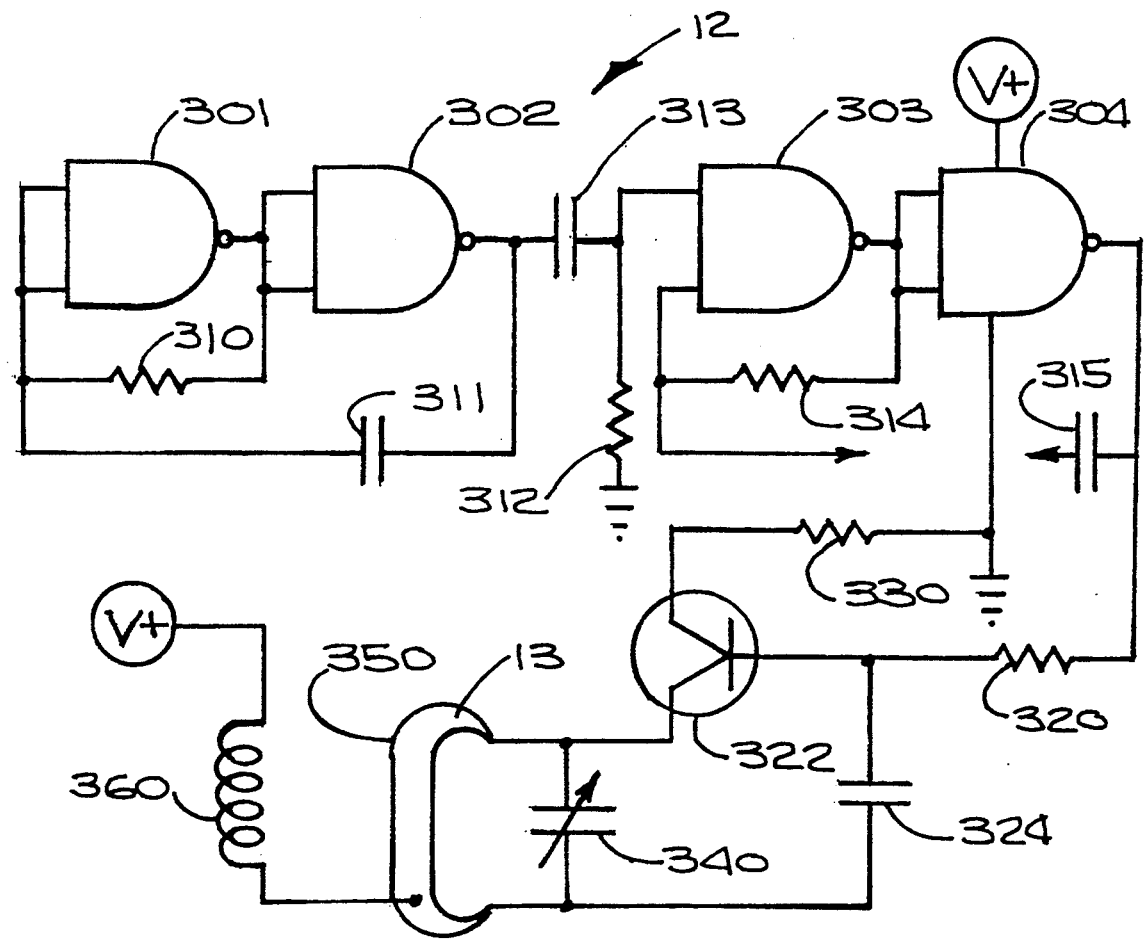
FIG. 6 is a schematic diagram of the preferred form of the transmitter of FIG. 5.

A representative transmitter circuit 12 is shown in block diagram form, in FIG. 5, and in schematic in FIG. 6. In FIG. 5, it may be seen that transmitter 12 primarily comprises a Hartley magnetic dipole transmitter 28 which is driven by a square-wave generator 22, a positive going edge detector 24 and a gated square-wave generator 26. Square-wave generator 22 operates to produce a square-wave having a frequency of 0.1 hertz. That is, square-wave generator 22 produces a voltage pulse every ten seconds, and this pulse is presented to positive going edge detector 24. Going edge detector 24 responds to the occurrence of each pulse to produce a pulse having a duration of approximately 0.1 seconds so that the resulting signal is a pulse train wherein each pulse has a pulse width of 0.1 second, and where a pulse occurs every ten seconds. This pulse is then presented to a gated square-wave generator 26 which modulates the pulses at a selected frequency; this frequency is preferably approximately 700 hertz. This pulse is then presented to the Hartley magnetic dipole transmitter 28 so that is operative to switch and off the transmitter with a modulation frequency of 700 hertz for a period of 0.1 seconds at ten second intervals.

The schematic circuitry for transmitter 12 is shown in FIG. 6. Here, four nand gates are connected in series as is shown at 301, 302, 303 and 304. Preferably, this four nand gates are a single circuit element, such as a 74HC00 CMOS quad nand gate, which is divided to form two oscillators. Nand gate 301 acts as the square-wave generator 22 and produces a square-wave having a period determined by the values of resistor 310 and capacitor 311. Resistor 310 is selected to have a value of approximately ten megohm and capacitor 311 is selected to have a capacitance of 0.33 micro farad so that resulting period is approximately ten seconds. The duration of this pulse is controlled by resistor 312 and capacitor 313 which are effectively selected to have values of approximately ten megohms and 0.01 micro farads. Thus, the duration of the pulse is approximately 0.1 seconds, thus providing a duty cycle of approximately 1%. Nand gates 303 and 304 form the gated square-wave generator 26 and act to modulate the pulse from nand gates 301, 302 at a frequency determined by resistor 314 and capacitor 315. Resistor 314 is selected again to have a resistance of approximately ten megohm while capacitor 315 is selected to have a capacitance of approximately forty-seven pico farad so that resulting modulation frequency is approximately 700 hertz. This signal is fed through resistor 320 to a transistor 322 and is part of the Hartley magnetic dipole transmitter. Resistor 320 preferably has a resistance of approximately 100K ohms and transistor 322 may be any suitable transistor, such as that designated 2N3904. The emitter of transistor 322 is connected to ground through resistor 330 which may be 150 ohms while the collector of transistor 322 is connected to one side of a magnetic dipole transmitter coil 350. The base of transistor 322 is connected to the opposite side of transmitter coil 350 through a capacitor 324 that has a value of approximately 5 pico farads. Furthermore, a variable capacitor 340 is connected across magnetic dipole transmitter coil 350 and varies in a value of approximately 1–10 pico farads. Furthermore, magnetic dipole transmitter coil 350 is connected to positive voltage through a coil 360 having a value of 0.25 microhenries. The circuit of FIG. 6 may be placed on a printed circuit board, as is known in the art. Magnetic dipole transmitter coil 350 may then be actually a printed circuit board trace and should have a diameter of approximately ⅝ of an inch (~1.6 centimeters). Accordingly, transmitter 12 will produce a broadcast signal 200 of the type described with the respect to FIG. 3.

Figure 7:
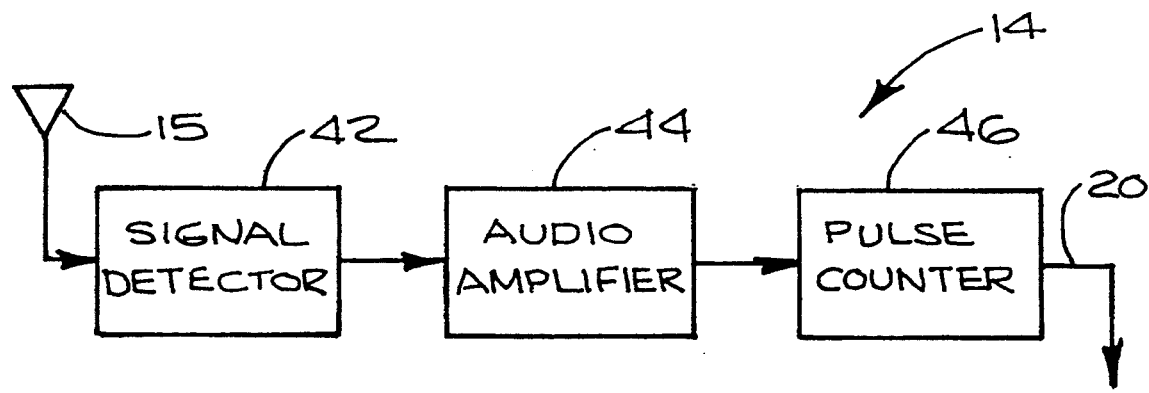
FIG. 7 is a block diagram showing a receiver of a type which may be used with the transmitter of FIG. 5.
Figure 8:
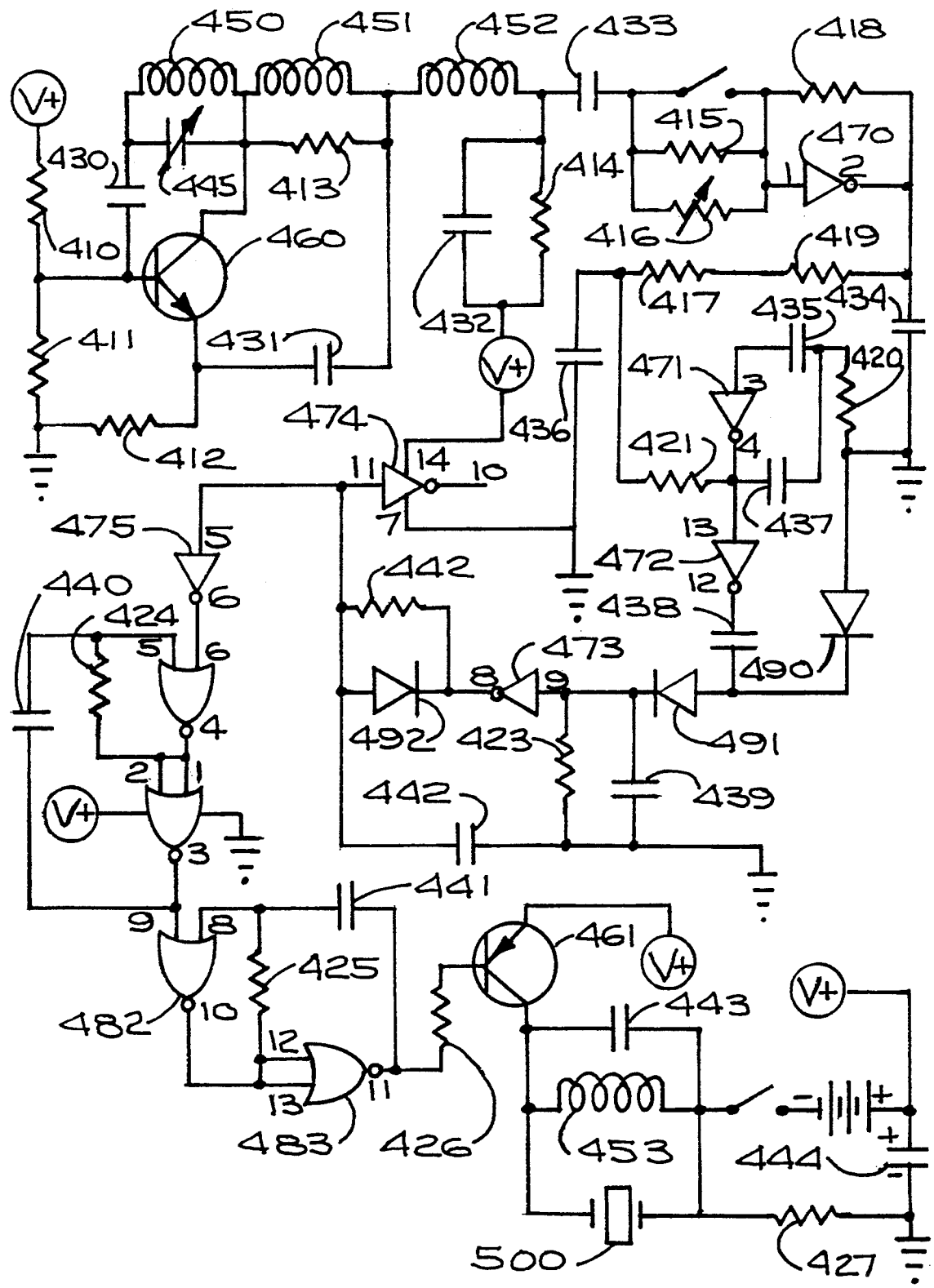
FIG. 8 is a schematic diagram of the preferred form of the receiver shown in FIG. 7.

A representative receiver block diagram is shown in FIG. 7, and in schematic in FIG. 8. Here, it should be understood that a variety of different receivers and/or transmitters could be implemented with the present invention so that the electronic circuitry described herein is by way of representation only. Indeed, circuitry, such as that disclosed in various patents described in the background of this invention, could be implemented as a component of the present invention without departing from the inventive scope.

In FIG. 7, then, it may be seen that receiver 14 broadly includes a signal detector 42 which receives at antenna 15 a broadcast signal generated by transmitter 12 when transmitter 12 is within the predetermined range. Signal detector 42 could, for example, be a super regenerative detector that decodes the signal similar to pulse train 220 shown in FIG. 3. This signal is then presented to audio amplifier 44 which amplifies the detected signal and the amplified pulse train is then presented to pulse counter 46 which senses the presence or absence of voltage pulses. So long as the pulses are present, no alarm signal is generated; however, when pulse counter 46 fails to detect pulses for a defined time interval, as measured by a sequence of the pulses, pulse detector 46 generates the out-of-range signal 20 which may be presented to the signal loss alarm 56 and the logic element 52, as described above.

One very useful circuit for receiver 14 is shown in FIG. 8. It is believed that this circuit is understandable to the ordinarily skilled person in the electrical engineering field when taken in conjunction with the following table which sets forth a preferred circuit elements.

TABLE II

Resistors

| Element | Value (ohm) | Element | Value (ohm) |
|---|---|---|---|
| 410 | 82K | 419 | 5.6K |
| 411 | 27K | 420 | 7.5K |
| 412 | 1.5K | 421 | 15K |
| 413 | 27K | 422 | 1M |
| 414 | 5.6K | 423 | 1M |
| 415 | 330K | 424 | 10M |
| 416 | 0-1 Meg | 425 | 470K |
| 417 | 15K | 426 | 5.6K |
| 418 | 1M | 427 | 510 |

Capacitors

| Element | Value (micro farad) | Element | Value (micro farad) |
|---|---|---|---|
| 430 | .000033 | 438 | .01 |
| 431 | .001 | 439 | .022 |
| 432 | .01 | 440 | .01 |
| 433 | .022 | 441 | .00047 |
| 434 | .001 | 442 | 2.2 |
| 435 | .01 | 443 | .01 |
| 436 | .022 | 444 | 33 |
| 437 | .01 | 445 | .000013 |

Transistors

| Element | Part No. |
|---|---|
| 460 | C 1730 NPN |
| 416 | H 9015 PNP |

Diodes

| Element | Part No. |
|---|---|
| 490 | IN4148 |
| 491 | IN4148 |
| 492 | IN4148 |

Furthermore, inverters 470-475 are preferably provided by a single hex inverter 4069UB and nor gates 480-483 are provided by a single quad nor gate 4001B. Loop 450 is the receiving antenna that is electrically and magnetically coupled to tuning tank loop 451. The antenna preferably is a "C-shaped" loop printed on the circuit board with an OD of ⅝ inch and an ID of ⅜ inch with a gap of 1/16 inch. Loop 452 is a choke valued at approximately 0.02 microhenries. Crystal 500 is provided in parallel to loop 453.

Figure 9:
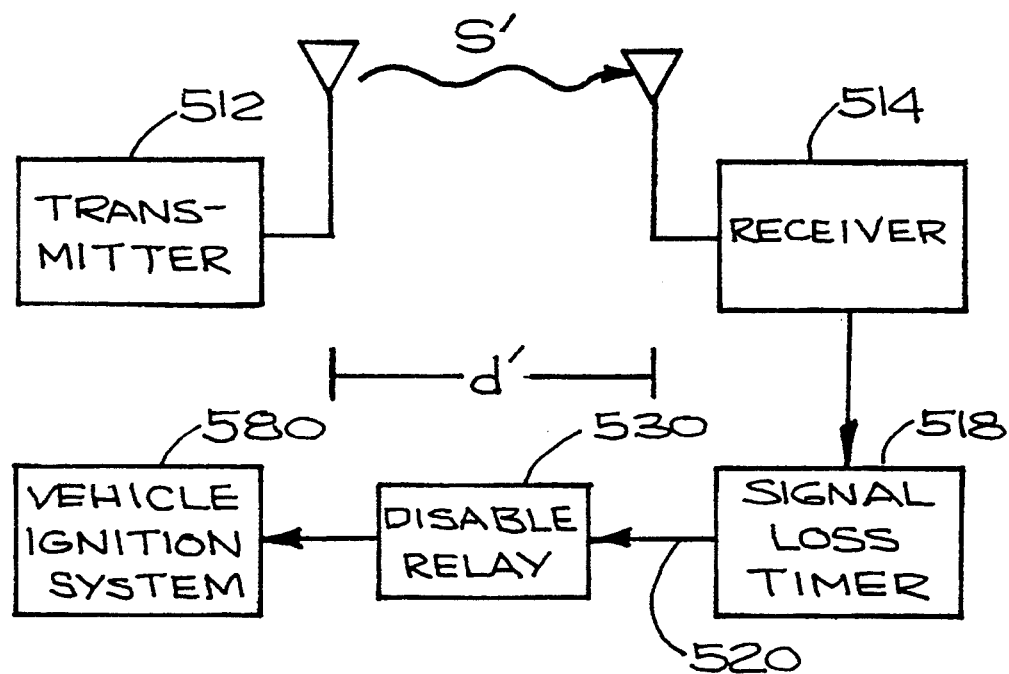
FIG. 9 is a block diagram of a more generalized exemplary embodiment of the present invention.

An alternative embodiment of the present invention, in a more simplified form, is shown in FIG. 9. Here, a signal S' is generated by transmitter 512 with signal S' being received by receiver 514 which includes a signal loss timer 518. Signal loss timer 518 generates an out-of-range signal 520 when the distance "d'", exceeds a preselected threshold distance of detection of signal S' by receiver 514. Here, however, rather than utilizing an event detector in conjunction with the absence of the detected signal, failure of receiver 512 to receive signal S' after a selected interval, such as a series of counted lost pulses, causes a disabled relay to activate directly. Disabled relay 530 thus directly responds to out-of-range signal 520 to interrupt the vehicle ignition system 580. Thus, in this embodiment, as soon as the vehicle carrying receiver 514 travels a distance greater than the predetermined threshold distance d', the vehicle is disabled and cannot be restarted until such time as that transmitter 512 is brought back within range.

Based on the foregoing, it should be understood that the general method according to the present invention contemplates the protection of a motor vehicle wherein the theft is accomplished by usurping the operation of the vehicle from an operator by displacing the operator out of the vehicle and removing the vehicle away from the vicinity of the operator. In this method, it is necessary that the vehicle be motor powered and include an electronic control circuit that allows the vehicle to function and disables the vehicle when disrupted. The broad method includes several steps, the first of which is the providing of a first means carried by the operator of the vehicle and a second means carried by the vehicle with the first and second means for detecting a distance of separation between the operator and the vehicle. Preferably, the first and second means are respectively a transmitter and a receiver which are coded to communicate with one another within a selected communication range so that the receiver generates an out-of-range signal when the separation range is exceeded. Preferably this occurs after a distance of separation has exceeded the threshold distance continuously for a selected time duration.

Returning to the general mode of methodology, a second step then contemplates interposing a switch element in the control circuit of the vehicle or in the switch element has as switch active state whereby the control circuit remains operative and a switch inactive state whereby the control circuit is disrupted to disable the vehicle. The third step of a general method includes the monitoring of the distance of separation between the operator and the vehicle and changing said switch element from the switch active to the switch inactive state when the distance of separation exceeds the threshold distance. This broad methodology may also include the step of monitoring for an occurrence of a selected event, such as a door opening, and wherein the step of changing the switch element from the switch active state to the switch inactive state occurs only if the distance of separation exceeds the threshold distance within a selected interval of time following occurrence of the selected event.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. Anti-theft apparatus adapted to interconnect with an electronic control circuit of a motor-powered vehicle and operative to selectively disrupt the control circuit to disable said vehicle, comprising:

(a) a transmitter adapted to be carried by a driver of the vehicle and operative to produce a broadcast signal of selected frequency;

(b) a receiver adapted to be carried by said vehicle and operative to receive the broadcast signal when said transmitter is within a communication range, said receiver including timer circuitry and operative to produce an out-of-range signal when said receiver fails to receive the broadcast signal only after said receiver fails to receive said broadcast signal for a selected time duration; and (c) a switch circuit including a switch element interposed in the control circuit of said vehicle, said switch element having a switch active state wherein the control circuit of said vehicle is operative and a switch inactive state wherein the control circuit of said vehicle is disrupted, said switch circuit operative in response to said out-of-range signal to cause said switch element to change from the switch active state to the switch inactive state thereby disrupting said control circuit to disable said vehicle.

2. Anti-theft apparatus according to claim 1 wherein said switch circuit is operative to lock said switch element in the switch inactive state in response to the out-of-range signal.

3. Anti-theft apparatus according to claim 2 including a reset circuit that is selectively actuatable to unlock said switch element from the switch inactive state.

4. Anti-theft apparatus according to claim 1 wherein said selected time duration is approximately five seconds.

5. Anti-theft apparatus adapted for use with a motor-powered vehicle including an operator compartment with an access door and that has an electronic control circuit and an electronic door monitoring circuit operative to sense an opening of said door, said apparatus operative to disrupt said control circuit to disable said vehicle, comprising:

(a) a transmitter adapted to be carried by a driver of the vehicle and operative to produce a broadcast signal of selected frequency;

(b) a receiver adapted to be carried by said vehicle and operative to receive the broadcast signal when said transmitter is within a communication range, said receiver operative to produce an out-of-range signal when said receiver fails to receive the broadcast signal;

(c) a switch circuit including a switch element interposed in the control circuit of said vehicle, said switch element having a switch active state wherein the control circuit of said vehicle is operative and a switch inactive state wherein the control circuit of said vehicle is disrupted; and (d) a detector circuit interconnected to said door monitoring circuit and operative in response to the opening of said door to produce an arming signal, said switch circuit operative in response to a presence of both said arming signal and said out-of-range signal to produce a disable signal, said switch element responsive to said disable signal to change from the switch active state to the switch inactive state thereby disrupting said control circuit to disable said vehicle.

6. Anti-theft apparatus according to claim 5 wherein said detector circuit includes a time-out sub-circuit operative to discontinue the arming signal following a time interval after the opening of said door.

7. Anti-theft apparatus according to claim 6 wherein said time interval is selected to be in a range of two to five minutes.

8. Anti-theft apparatus according to claim 5 including timer circuitry associated with said receiver whereby said out-of-range signal is produced only after said receiver fails to receive said broadcast signal for a selected time duration.

9. Anti-theft apparatus according to claim 5 including a reset circuit that may be selectively actuated to produce a reset signal, said switch control signal responsive to said reset signal to discontinue said disable signal.

10. Anti-theft apparatus according to claim 5 including a signal loss indicator operative to indicate production of said out-of-range signal.

11. Anti-theft apparatus according to claim 5 including an armed state indicator operative to indicate production of said arming signal.

12. Anti-theft apparatus according to claim 5 including a disable indicator operative to indicate production of said disable signal.

13. In a motor-powered vehicle adapted to be operated by an operator and having an electronic control circuit that allows said vehicle to function and that disables said vehicle when disrupted, the improvement comprising a switch element interposed in the control circuit and having an active state whereby said control circuit is operative and an inactive state whereby said control circuit is disrupted, a transmitter adapted to be carried by the operator of the vehicle and operative to produce a broadcast signal of selected frequency, a receiver adapted to be carried by said vehicle and operative to receive the broadcast signal when said transmitter is within a communication range, said receiver operative to produce an out-of-range signal when said receiver fails to receive the broadcast signal, an event detector operative to sense an occurrence of a selected event and to produce an arming signal in response to the occurrence, and a switch circuit operative in response to said out-of-range signal to cause said switch element to change from said active state to said inactive state thereby disrupting said control circuit to disable said vehicle only when said arming signal is present.

14. Anti-theft apparatus according to claim 13 wherein said event detector monitors a door of said vehicle and produces said arming signal in response to an opening of said door.

15. Anti-theft apparatus according to claim 14 wherein said vehicle includes an electronic door monitoring circuit operative to detect the opening of said door, and wherein said event detector is electrically connected to said door monitoring circuit.

16. Anti-theft apparatus according to claim 13 including timer circuitry associated with said receiver whereby said out-of-range signal is produced only after said receiver fails to receive said broadcast signal for a selected time duration.

17. Anti-theft apparatus according to claim 13 wherein said event detector includes a time-out circuit operative to discontinue the arming signal following a time interval after the occurrence of the event.

18. A method of protecting a motor vehicle from theft accomplished by usurping operation of the vehicle from an operator thereof, displacing the operator out of the vehicle and removing the vehicle away from the operator wherein said vehicle is motor-powered and has an electronic control circuit that allows said vehicle to function and that disables said vehicle when disrupted, comprising the steps of:
  (a) providing first means carried by the operator of said vehicle and second means carried by said vehicle, said first and second means for detecting a distance of separation between said operator and said vehicle;
  (b) interposing a switch element in said control circuit wherein said switch element has a switch active state whereby said control circuit is operative and a switch inactive state whereby said control circuit is disrupted; and
  (c) monitoring the distance of separation between said operator and said vehicle and changing said switch element from the switch active state to the switch inactive state when the distance of separation exceeds a threshold distance continuously for a selected time duration.

19. The method according to claim 18 including the step of monitoring for an occurrence of a selected event and wherein the step of changing said switch element from the switch active state to the switch inactive state occurs only if the distance of separation exceeds the threshold distance within a selected interval of time following occurrence of the selected event.

20. The method according to claim 19 wherein said vehicle has an operator compartment door and wherein the selected event is an opening of the door of said vehicle.

21. The method according to claim 20 wherein said vehicle has a door monitoring circuit operative to sense the opening of said door, the step of monitoring for the opening of said door being accomplished by monitoring said door monitoring circuit.

22. Anti-theft apparatus adapted to interconnect with an electronic control circuit of a motor-powered vehicle and operative to selectively disrupt the control circuit to disable said vehicle, comprising:
  (a) a transmitter adapted to be carried by a driver of the vehicle and operative to produce a broadcast signal of selected frequency;
  (b) a receiver adapted to be carried by said vehicle and operative to receive the broadcast signal when said transmitter is within a communication range, said receiver operative to produce an out-of-range signal when said receiver fails to receive the broadcast signal;
  (c) an event detector operative to sense an occurrence of a selected event and to produce an arming signal in response to the occurrence; and
  (d) a switch circuit including a switch element interposed in the control circuit of said vehicle, said switch element having a switch active state wherein the control circuit of said vehicle is operative and a switch inactive state wherein the control circuit of said vehicle is disrupted, said switch circuit operative in response to said out-of-range signal to cause said switch element to change from the switch active state to the switch inactive state thereby disrupting said control circuit to disable said vehicle only when said arming signal is present.

23. Anti-theft apparatus according to claim 22 wherein said event detector includes a time-out circuit operative to discontinue the arming signal following a time interval after the occurrence of the event.

24. Anti-theft apparatus according to claim 23 wherein said time interval is selected to be in a range of two to ten minutes.

25. Anti-theft apparatus according to claim 22 wherein said event detector monitors a door of said vehicle and produces said arming signal in response to an opening of said door.

26. Anti-theft apparatus according to claim 25 wherein said vehicle includes an electronic door monitoring circuit operative to detect the opening of said door, and wherein said event detector is electrically connected to said door monitoring circuit.

* * * * *

REEXAMINATION CERTIFICATE (2996th)

United States Patent [19]

Smith

[11] B1 5,349,329
[45] Certificate Issued Sep. 10, 1996

[54] VEHICLE SECURITY APPARATUS AND METHOD

[75] Inventor: Jerry R. Smith, Littleton, Colo.

[73] Assignee: Ideaz International, Inc., Englewood, Colo.

Reexamination Request:
No. 90/003,980, Sep. 14, 1995

Reexamination Certificate for:
Patent No.: 5,349,329
Issued: Sep. 20, 1994
Appl. No.: 59,448
Filed: May 7, 1993

[51] Int. Cl.$^6$ .............................. G08B 1/08; B60R 25/10
[52] U.S. Cl. .................... 340/539; 340/426; 340/430; 340/522; 340/545; 307/10.2; 307/10.3; 180/287
[58] Field of Search ......................... 340/430, 522, 340/527, 545, 539, 426, 425.5; 307/10.3, 10.2; 180/287, 289

[56] References Cited

U.S. PATENT DOCUMENTS

| | | | |
|---|---|---|---|
| 3,639,897 | 2/1972 | Teich | 340/430 |
| 3,646,515 | 2/1972 | Vodehnal | 340/64 |
| 3,781,789 | 12/1973 | Caleskie et al. | 307/10.3 |
| 4,023,138 | 5/1977 | Ballin | 340/64 |
| 4,101,873 | 7/1978 | Anderson et al. | 340/539 |
| 4,143,368 | 3/1979 | Route et al. | 340/543 |
| 4,260,982 | 4/1981 | DeBenedictis et al. | 340/539 |
| 4,598,272 | 7/1986 | Cox | 340/539 |
| 4,598,275 | 7/1986 | Ross et al. | 340/573 |
| 4,675,656 | 1/1987 | Narcisse | 340/539 |
| 4,733,215 | 3/1988 | Memmola | 340/64 |
| 4,785,291 | 11/1988 | Hawthorne | 340/573 |
| 4,924,206 | 5/1990 | Ayers | 340/426 |
| 4,942,393 | 7/1990 | Waraksa et al. | 340/825 |
| 4,987,406 | 1/1991 | Reid | 340/539 |
| 5,124,565 | 6/1992 | Yoshida et al. | 307/9.1 |
| 5,132,660 | 7/1992 | Chen et al. | 340/428 |

FOREIGN PATENT DOCUMENTS

| | | |
|---|---|---|
| 0314143 | 5/1989 | European Pat. Off. . |
| 9202911 | 2/1992 | WIPO . |

Primary Examiner—Jeffery A. Hofsass

[57] ABSTRACT

An anti-theft apparatus to prevent "car jacking" includes a transmitter carried by the driver and a receiver and a switch circuit installed in the vehicle such that, when the receiver fails to detect the signal broadcast by the transmitter, the switch circuit disables the vehicle for operation. Timer circuitry is disclosed to cause the disablement only after a selected period that the broadcast signal is lost. An event detector, such as a switch circuit connected to the door light switch circuit of the vehicle, may be used to arm the disable circuit for a selected period so that disablement occurs only when the transmitter and reciever are separated beyond their communication range during a defined time interval following the occurrent of the event.

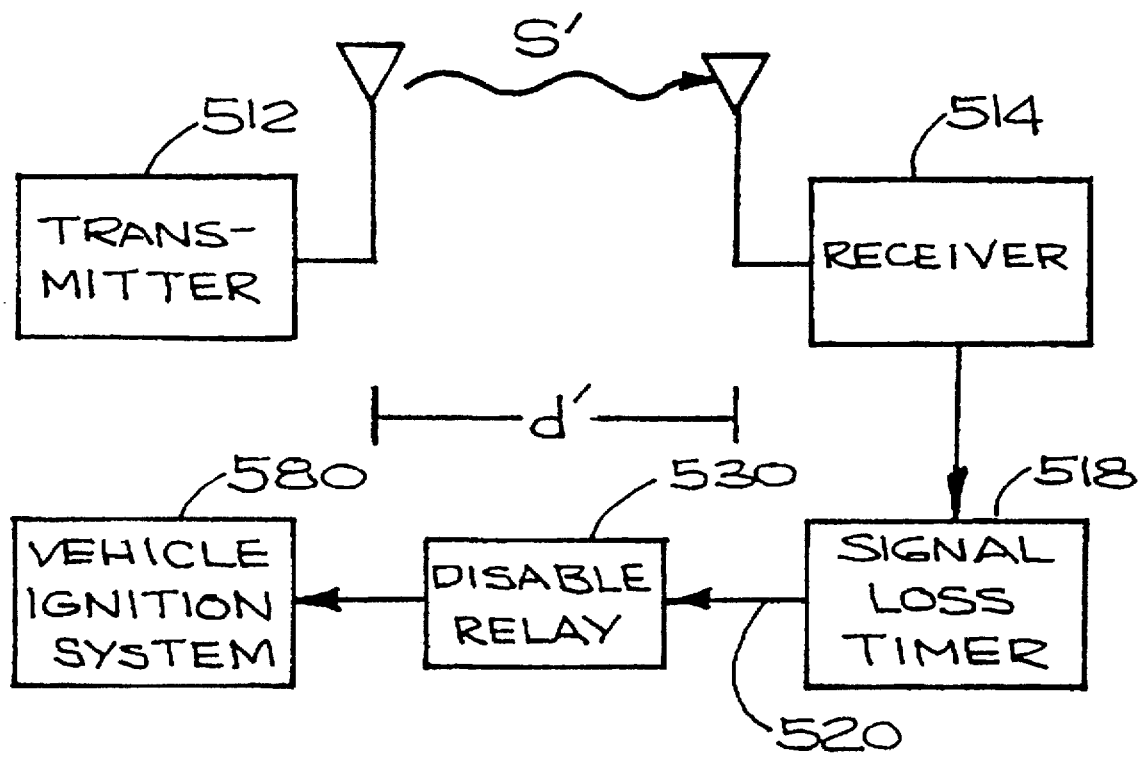

B1 5,349,329

REEXAMINATION CERTIFICATE ISSUED UNDER 35 U.S.C. 307

NO AMENDMENTS HAVE BEEN MADE TO THE PATENT.

AS A RESULT OF REEXAMINATION IT HAS BEEN DETERMINED THAT:

The patentability of claims 1–26 is confirmed.

* * * * *